United States Patent
Dudziak et al.

(10) Patent No.: US 9,812,698 B2
(45) Date of Patent: Nov. 7, 2017

(54) METHOD FOR MANUFACTURING A CONNECTING CONTACT FOR AN ELECTRODE OF AN ELECTROCHEMICAL STORE, METHOD FOR MANUFACTURING AN ELECTROCHEMICAL STORE, AND ELECTROCHEMICAL STORE

(71) Applicant: Robert Bosch GmbH, Stuttgart (DE)

(72) Inventors: Sonja Dudziak, Bietigheim-Bissingen (DE); Reiner Ramsayer, Rutesheim (DE); Jens Koenig, Markgroeningen (DE); Michael Guyenot, Ludwigsburg (DE); Rico Bauer, Windischenbach (DE); Sebastian Fritz, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 729 days.

(21) Appl. No.: 13/949,797

(22) Filed: Jul. 24, 2013

(65) Prior Publication Data
US 2014/0038013 A1 Feb. 6, 2014

(30) Foreign Application Priority Data
Jul. 31, 2012 (DE) ........................ 10 2012 213 420

(51) Int. Cl.
| | |
|---|---|
| *H01M 4/04* | (2006.01) |
| *H01M 2/26* | (2006.01) |
| *H01M 2/02* | (2006.01) |
| *H01M 10/052* | (2010.01) |

(52) U.S. Cl.
CPC ............ *H01M 4/045* (2013.01); *H01M 2/26* (2013.01); *H01M 2/0257* (2013.01); *H01M 2/263* (2013.01); *H01M 10/052* (2013.01)

(58) Field of Classification Search
USPC ........................... 429/94, 161, 211; 205/122
See application file for complete search history.

(56) References Cited

U.S. PATENT DOCUMENTS

| | | | | |
|---|---|---|---|---|
| 6,500,585 | B1 * | 12/2002 | Saakes | H01M 4/20 429/232 |
| 6,610,444 | B2 * | 8/2003 | Akita | H01M 2/06 429/174 |
| 6,692,863 | B1 * | 2/2004 | Nakanishi | H01M 2/263 429/133 |
| 2002/0004162 | A1 * | 1/2002 | Satoh | H01M 2/263 429/94 |
| 2007/0298317 | A1 * | 12/2007 | Brodd | H01M 2/263 429/94 |
| 2012/0219844 | A1 * | 8/2012 | Tsutsumi | H01G 11/06 429/153 |

FOREIGN PATENT DOCUMENTS

| | | |
|---|---|---|
| CN | 101443936 A | 5/2009 |
| CN | 102208591 A | 10/2011 |
| KR | 20050123484 A | 12/2005 |

* cited by examiner

*Primary Examiner* — Osei Amponsah
(74) *Attorney, Agent, or Firm* — Norton Rose Fulbright US LLP; Gerard Messina

(57) ABSTRACT

In a method for manufacturing a connecting contact for an electrode of an electrochemical store, the electrode having a first material, a contact element made of a second material is provided, the contact element having a section coated using the first material, and the coated section is electrically and mechanically connected to the electrode to manufacture the connecting contact.

15 Claims, 3 Drawing Sheets

METHOD FOR MANUFACTURING A CONNECTING CONTACT FOR AN ELECTRODE OF AN ELECTROCHEMICAL STORE, METHOD FOR MANUFACTURING AN ELECTROCHEMICAL STORE, AND ELECTROCHEMICAL STORE

BACKGROUND OF THE INVENTION

1. Field of the Invention

The present invention relates to a method for manufacturing a connecting contact for an electrode of an electrochemical store, to a method for manufacturing an electrochemical store, and to an electrochemical store thus manufactured.

2. Description of the Related Art

Lithium-ion batteries represent a technology which is accepted worldwide and are used to an increasing extent in the automotive field. A battery includes electrodes, a separator to separate the electrodes to prevent short-circuits, an electrolyte, and a housing as a carrier of the chemicals and for fixing the electrodes. One possible design principle is represented by the "jelly roll," in which a foil packet made of cathode, separator, and anode is rolled up. In the selection of the electrode carrier material, connecting terminal material, and housing material (aluminum, copper, steel), it is to be ensured that no secondary electrochemical element pairs are produced, which could result in undesirable effects, e.g., corrosion. Therefore, the outer connecting terminals are generally made of the same material as the particular electrode foils, which may be, for example, a copper anode and an aluminum cathode.

BRIEF SUMMARY OF THE INVENTION

The present invention provides a method for manufacturing a connecting contact for an electrode of an electrochemical store, a method for manufacturing an electrochemical store, and an electrochemical store manufactured according to the method of the present invention.

By coating an outer connecting terminal of an electrode of an electrochemical store using a material having good electrical conductivity, an otherwise typical solid material transition of the electrode to the outer connecting terminal may be omitted during the manufacture of the electrochemical store. For example, copper may be used as the coating material, from which the electrode, e.g., the anode of the electrochemical store, may also be manufactured. In contrast, the connecting terminal may be formed from aluminum, for example. The mentioned materials are only indicated here and hereafter as examples, however.

A method for manufacturing a connecting contact for an electrode of an electrochemical store, the electrode having a first material, includes the following steps:

providing a contact element made of a second material, the contact element having a section coated using the first material; and electrically and mechanically connecting the coated section of the contact element to the electrode to manufacture the connecting contact.

The electrochemical store may be an accumulator, for example, a lithium-ion battery. Such accumulators are currently used, for example, in PCs and notebooks, power tools, electric bikes, and to an increasing extent within the scope of the electrification in the automotive field. The electrode may be the anode or cathode of the electrochemical store. Using the connecting contact, an electrical and mechanical connection of the electrode and therefore of the electrochemical store to an external circuit may be established, so that the electrochemical store may be used in its function as a power source. The first material may be a metal having good electrical conductivity. The electrode may be formed exclusively from the first material or may be formed from an alloy which contains the first material. The contact element, which may also be referred to as a connecting terminal, may exclusively be formed from the second material or from an alloy which contains the second material, notwithstanding the coating. The second material may also be a metal having good electrical conductivity. The contact element may be designed in the form of a rod. Accordingly, the coated section may include at least an end area of the rod. The coated section may also extend over a better part of the contact element or over the entire contact element. The coating may have a thickness in the double-digit micrometer range and may be homogeneously joined all over a surface of the section of the contact element, so that an electric current having a preferably low resistance may flow between the coating and the contact element material underneath. The electrical and mechanical connection of the coated section of the contact element to the electrode may be an integral connection, which may be established by a processing technique, for example, in a welding process. The connection may be established in order to provide robust mechanical fixing of the contact element on the electrode and a preferably low-resistance current transfer between the electrode and the contact element. The method may be carried out with the aid of a machine tool in simple processing steps having high throughput.

According to the described approach, a significant, detectable weight reduction and a process simplification may be achieved during the manufacture of electrochemical stores. By using an aluminum anode laminated with copper, for example, for a lithium-ion battery for connecting the battery to an external circuit, it may be manufactured to be much lighter and using a simpler process. This is possible since the density of copper (Cu) at 8.9 g/cm$^3$ is greater by a factor of three than the density of aluminum (Al) at 2.7 g/cm$^3$. Only a thin copper layer—for example, a few tens of micrometers—is required on the aluminum anode in order to be able to contact a copper electrode foil via ultrasonic welding, for example. The anode thus becomes lighter and is easier to manufacture with respect to processing, since the previous material transition by friction welding from the inner copper anode to the outer aluminum connecting terminal is omitted. In addition, for improved assembly of individual cells to form a module, use of the same material—for example, aluminum—for both connecting terminals of the electrochemical store is advantageous. A solid friction welding connection outside the cell to merge the inner copper anode into the outer aluminum connecting terminal may thus be omitted. Furthermore, an improvement of the reliability of the connection points may be implemented by the replacement of welded bonds in a cell or a cell module.

According to one specific embodiment of the method, the first material may have copper and the second material may have aluminum. Both copper and aluminum are distinguished by good electrical conductivity, aluminum also additionally having the particular advantage of a low specific weight. Due to the fact that the electrode is formed from aluminum here and is only coated with a relatively thin copper layer, the connecting contact may advantageously be reduced in weight, without the electrical conductivity of the assembly thus being reduced. Instead of pure copper or aluminum, in each case a suitable alloy may also be used, which includes the particular element.

According to another specific embodiment, in the step of electrical and mechanical connection, the coated section of the contact element may be connected to the electrode in an ultrasonic welding process. Ultrasonic welding is characterized in that the joining partners, the electrode and the contact element here, may be securely connected without having to be heated up to the melting point. Accordingly, the method has the advantages of very short welding times and therefore greater cost-effectiveness.

A method for manufacturing an electrochemical store has the following steps:

providing an electrochemical storage element, which includes a first electrode, a second electrode, and a separator situated between the first electrode and the second electrode, the first electrode having a first material and the second electrode having a second material;

providing a first contact element for connecting the first electrode to a circuit and a second contact element for connecting the second electrode to the circuit, the first contact element and the second contact element having the second material;

coating at least one section of the first contact element using the first material; and electrically and mechanically connecting the coated section of the first contact element to the first electrode and electrically and mechanically connecting the second contact element to the second electrode, in order to manufacture the electrochemical store.

The electrochemical store may be the lithium-ion accumulator already mentioned at the outset. The first electrode may be the anode and the second electrode may be the cathode. The separator may have the task of spatially separating the two electrodes, so that a current flow may be generated in the electrochemical storage element. For this purpose, the separator may be designed to be permeable to ions. As already explained, the first material may be copper, for example, from which the first electrode may be manufactured in pure form or in an alloy. The second material may be aluminum, from which the second electrode may be manufactured in pure form or in an alloy. The first contact element and the second contact element may each have the above-explained rod shape and accordingly may be formed from aluminum or an aluminum alloy. The step of electrically and mechanically connecting the first contact element to the first electrode and the second contact element to the second electrode may be carried out, as explained above, in a welding process, for example, ultrasonic welding. An integral connection may thus be established between the first contact element and the first electrode and between the second contact element and the second electrode. The electrochemical store may thus be finished at least as a semi-finished product and connected to an external circuit.

According to one specific embodiment of the method, in the step of coating, the first material may be applied to the entirety of the section of the first contact element in an electroplating process. Using the electroplating process, it may be ensured that the first material may be applied particularly uniformly and in a relatively thin layer to the section of the first contact element. In addition, by applying the coating over the entirety, the connection of the first contact element to the first electrode may be established easily and quickly, since the contact element thus does not need to be aligned in relation to the electrode for the connection.

Furthermore, the method may have a step of removal of a top layer of the section of the first contact element, in order to prepare the section for the step of coating. The step of removal may take place, for example, by applying a zincate pickling solution to the section if the first contact element has aluminum. A thin zinc layer may thus be formed on the section, which may represent the ideal foundation for the application of a copper layer, for example, with the aid of electroplating. The advantage is therefore provided that the coating may be connected still more homogeneously to its underlay and therefore optimum current conduction properties of the first contact element may be provided.

An electrochemical store has the following features:

an electrochemical storage element, which includes a first electrode, a second electrode, and a separator situated between the first electrode and the second electrode, the first electrode having a first material and the second electrode having a second material; and a first contact element, which is integrally joined to the first electrode and is designed to connect the first electrode to a circuit, and a second contact element, which is integrally joined to the second electrode and is designed to connect the second electrode to the circuit, the first contact element and the second contact element having the second material and at least one section of the first contact element being coated using the first material.

The electrochemical store may be manufactured according to the above-explained method.

According to one specific embodiment of the electrochemical store, the first electrode, the second electrode, and the separator situated between the first electrode and the second electrode may each be designed in the form of a layer and stacked on top of one another and wound up into a roll to form the electrochemical storage element. The first electrode and the second electrode may be situated offset to one another in the stack in such a way that in the wound-up roll, an edge area of the first electrode protrudes on one side of the roll and is designed to contact the first contact element and an edge area of the second electrode protrudes on a further side of the roll, which is opposite to the first side, and is designed to contact the second contact element. For example, the first electrode, the second electrode, and the separator may each be designed in their basic shape as a rectangular shape of approximately equal size. Using the specific embodiment as a roll, in which the electrochemical store may also be referred to as a "jelly roll," the electrochemical store may be used in a particularly space-saving way. Using the edges of the electrodes protruding on opposing sides, it may be ensured in a simple way that the electrochemical store may also in the rolled-up state be readily connected via the contact elements to an outer circuit.

Furthermore, the electrochemical store may have a housing having the second material. The housing may be designed to accommodate the electrochemical storage element and to permit a connection of the electrochemical store to the circuit with the aid of a first passage opening for the first contact element and a second passage opening for the second contact element. The electrochemical store may be effectively protected from contaminants and corrosion using the housing.

According to one specific embodiment, to manufacture an electrochemical store in the form of a battery, a copper layer may be applied by electroplating to the area, which is later located in the battery, of a contact element in the form of an aluminum electrode. This may be carried out after removal of a natural aluminum oxide layer of the aluminum electrode, for which a zincate pickling solution may be used to form a thin zinc layer, for example. The contact of the copper-laminated aluminum electrode with an electrode in the form of a copper carrier foil may be established via ultrasonic welding. The cathode side may be made, in accordance with known batteries, of an electrode in the form of an aluminum foil connected to a contact element in the form of an aluminum electrode.

The packet, made of the jelly roll including the copper carrier foil and the aluminum foil, contacted with corresponding contact elements or connecting terminals in the form of the copper-laminated aluminum electrode and the aluminum electrode, may subsequently be installed having appropriate insulation in a housing, for example, in an aluminum housing, and further processed as heretofore.

The concept presented herein of an improved battery design, in particular of the anodic current collector for lithium-ion cells, is to be explained in greater detail as an example on the basis of the appended drawings.

DETAILED DESCRIPTION OF THE INVENTION

Figure 1A:
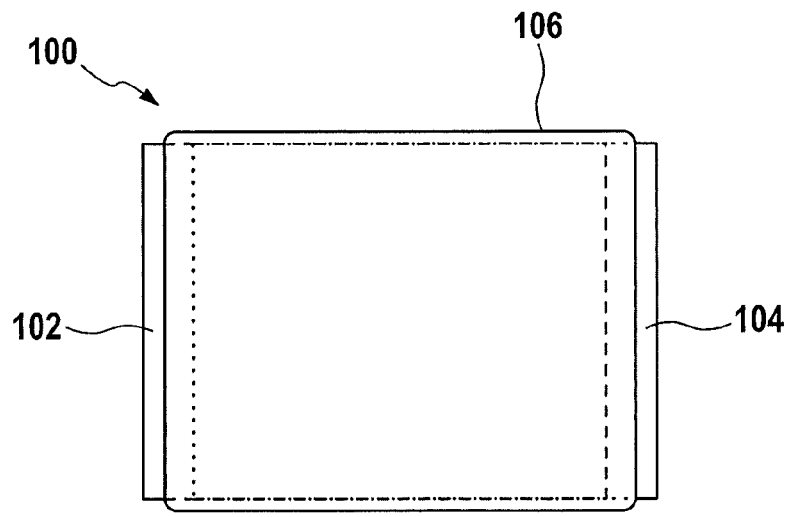
FIG. 1A shows a top view of an electrochemical storage element according to one exemplary embodiment of the present invention.

In the following description of preferred exemplary embodiments of the present invention, identical or similar reference numerals are used for the elements which are shown in the various figures and act similarly, a repeated description of these elements being omitted.

FIG. 1A shows a top view of one exemplary embodiment of an electrochemical storage element 100. Electrochemical storage element 100 is composed of a first electrode 102, a second electrode 104 and a separator (not visible in the illustration of electrochemical storage element 100 in FIG. 1A). The individual elements are stacked on top of one another in layers and are rolled up to form a so-called jelly roll. This is visible particularly well from following FIG. 2B. In the exemplary embodiment shown here, first electrode 102 is designed as the anode of electrochemical storage element 100 and second electrode 104 is designed as the cathode of electrochemical storage element 100. Electrochemical storage element 100 is enclosed by a protective foil 106 for protection from damage and corrosion. The top view shows that in the illustration, on the left an edge area of anode 102 and on the right an edge area of cathode 104 protrude beyond the protective foil out of electrochemical storage element 100, which is formed into the roll. This is achieved in that the layers of anode 102, cathode 104, and the separator are stacked offset to one another before they are rolled up. This is understandable more easily if one observes the dashed lines and dotted lines in the illustration. Thus, the dashed lines identify a location of anode foil 102 in the jelly roll—concealed by protective foil 106 and/or cathode 104 except for the edge area. In contrast, the dotted lines identify a location of cathode foil 104 in the jelly roll—concealed by protective foil 106 and/or anode 102 except for the edge area.

Figure 1B:
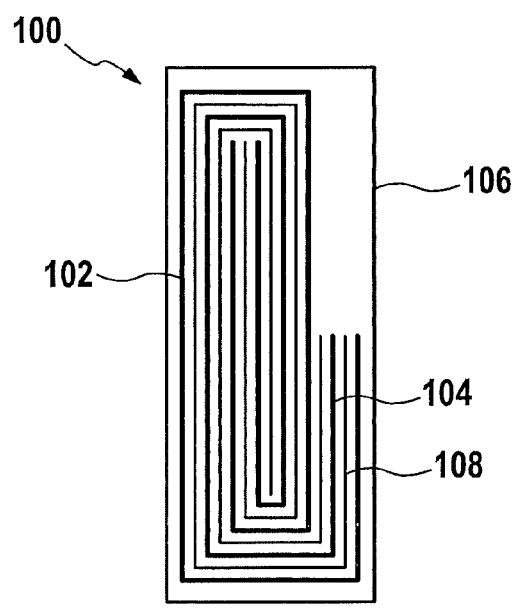
FIG. 1B shows a side view of the electrochemical storage element from FIG. 1A.

FIG. 1B shows electrochemical storage element 100 from FIG. 1A in a side view. It may be clearly seen in this illustration that first electrode or anode 102, second electrode or cathode 104, and a separator 108 are designed as plies or layers, which were stacked on top of one another and rolled up to form the jelly roll. The assembly is designed in such a way that separator layer 108 is situated as an insulator between anode layer 102 and cathode layer 104, in order to spatially and electrically separate them. As already explained, the entire layer assembly—except for one edge area in each case of anode 102 and cathode 104—is enclosed by protective foil 106. In electrochemical storage element 100 shown in FIGS. 1A and 1B, the anode is made of copper and the cathode is made of aluminum.

Figure 2A:
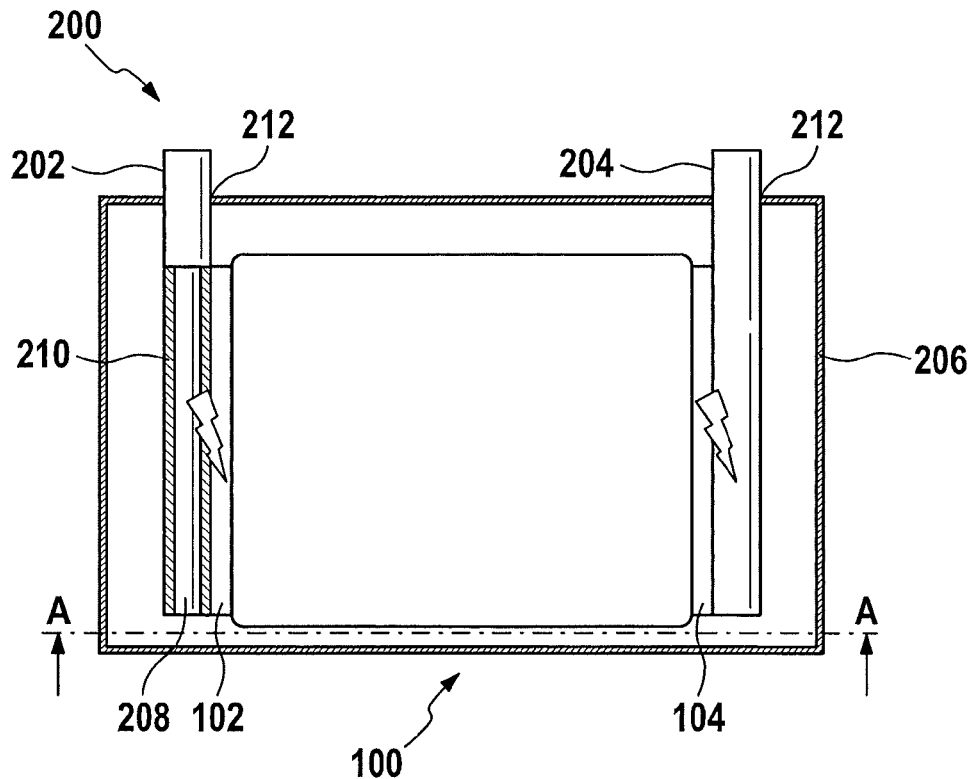
FIG. 2A shows a longitudinal section through an electrochemical store according to one exemplary embodiment of the present invention.

FIG. 2A shows a longitudinal sectional illustration of an electrochemical store 200 according to one exemplary embodiment of the present invention. Electrochemical store 200 includes electrochemical storage element 100, a first contact element 202, a second contact element 204, and a housing 206. As the illustration shows, first contact element 202 is situated adjoining first electrode or anode 102 of electrochemical storage element 100 and second contact element 204 is situated adjoining second electrode or cathode 104 of electrochemical storage element 100. In the exemplary embodiment shown here of electrochemical store 200, first contact element 202 and second contact element 204 are each designed in a rod shape and are made of aluminum. As the illustration in FIG. 2A shows, a section 208 of first contact element 202 has a coating 210 made of copper. The illustration shows that coated section 208 of first contact element 202 has a length which corresponds to a height of the edge area of first electrode 102, which protrudes laterally out of the assembly of electrochemical storage element 100. Copper-coated section 208 is situated adjoining first electrode 102, which is formed from copper, and is integrally joined thereto. On the cathode side, second contact element 204, which is formed from aluminum, has no coating and is directly connected to second electrode 104, which is also formed from aluminum. In the exemplary embodiment shown here, first contact element 202 and second contact element 204 are contacted with the aid of an ultrasonic welding process to electrochemical storage element 100. This is symbolized by lightning symbols in the illustration in FIG. 2A. Housing 206 encloses electrochemical storage element 100 and contact elements 202, 204, which are integrally joined thereto, in such a way that end areas of first contact element 202 and second contact element 204 protrude out of the housing through suitable passage openings 212 in a wall of housing 206. Therefore, first contact element 202 and second contact element 204 each form a connecting terminal for connecting electrochemical store 200 to a circuit.

Figure 2B:
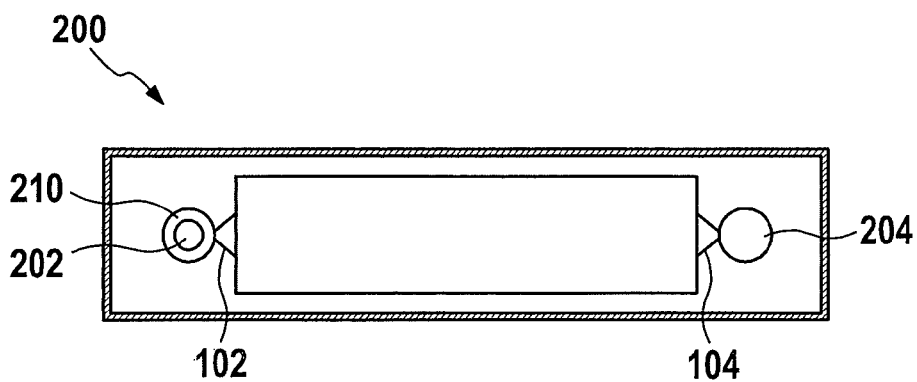
FIG. 2B shows a cross section through the electrochemical store from FIG. 2A.

FIG. 2B shows electrochemical store 200 from FIG. 2A in a cross section along line A-A in FIG. 2A. The left side shows very well here that in this exemplary embodiment of electrochemical store 200, coating 210 is situated on the entirety of the surface of first contact element 202. The edge area of wound first electrode 102 has been pressed together in such a way that a single contact point is formed to the aluminum rod of first contact element 202, which is laminated with copper layer 210. The connection established with the aid of ultrasonic welding between copper anode 102 and copper-laminated first contact element 202 is provided here. The connection is designed similarly on the cathode side on the right in the illustration in FIG. 2B, second contact element 204 having no coating, so that the surface of aluminum rod 204 is integrally joined to the edge area of second electrode 104, which is formed from aluminum.

Figure 3:
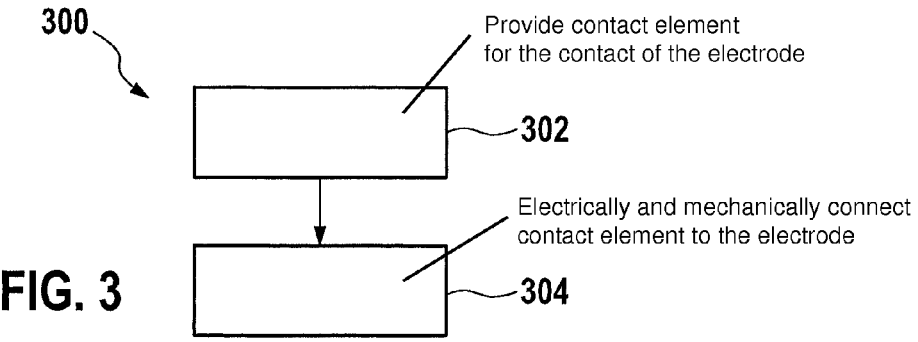
FIG. 3 shows a flow chart of a method for manufacturing a connecting contact for an electrode of an electrochemical store according to one exemplary embodiment of the present invention.

FIG. 3 shows a flow chart of one exemplary embodiment of a method 300 for manufacturing a connecting contact for an electrode of an electrochemical store, which is formed from a first material. The first material is, in this exemplary embodiment, the material copper, which is frequently used for manufacturing the anode of an electrochemical store. In a first step 302, a contact element for the contact of the electrode is provided. The contact element is formed from a second material—aluminum here—and has a section coated using copper. With the aid of an ultrasonic welding process, in a second step 304, the copper-coated section of the aluminum contact element is electrically and mechanically connected to the copper electrode, in order to manufacture the connecting contact.

Figure 4:
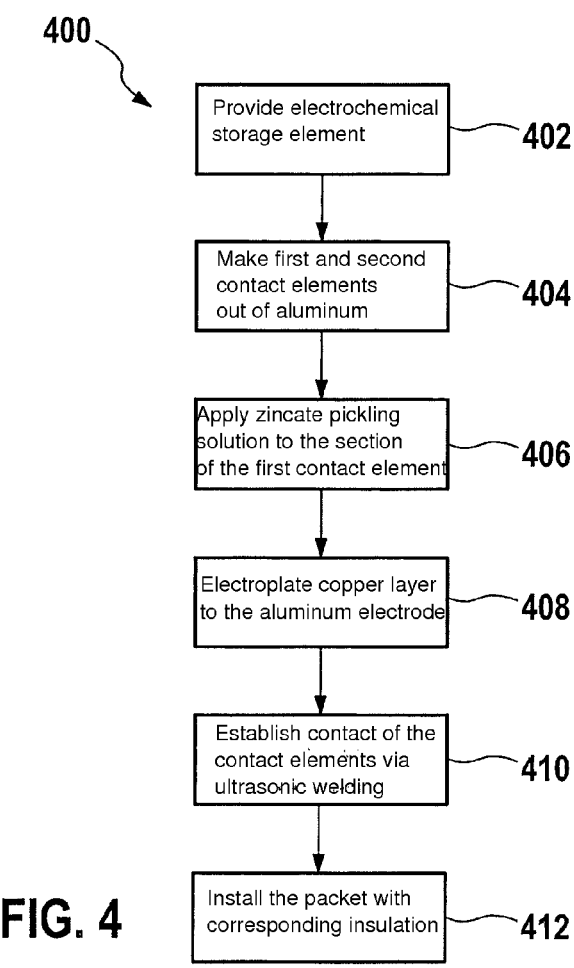
FIG. 4 shows a flow chart of a method for manufacturing an electrochemical store according to one exemplary embodiment of the present invention.

FIG. 4 shows a flow chart of one exemplary embodiment of a method 400 for manufacturing an electrochemical store in the form of a jelly roll as presented on the basis of FIGS. 2A and 2B. In a step 402, an electrochemical storage element is provided according to that provided on the basis of FIGS. 1A and 1B, having a first electrode made of copper, a second electrode made of aluminum, and a separator situated between the first electrode and the second electrode. A first contact element and a second contact element for connecting the first electrode and the second electrode to a circuit are provided in a step 404, the first contact element and the second contact element being made of aluminum. In a step 406, a zincate pickling solution is applied to a section of the first contact element, to remove a natural aluminum oxide layer on the section and to form a thin zinc layer. The section is thus prepared for subsequent step 408 of coating, in which a copper layer is applied by electroplating to the section of the aluminum electrode located later in the electrochemical store. In a step 410, a contact of the copper-laminated first aluminum contact element to the copper carrier foil or the copper electrode and a contact of the uncoated second aluminum contact element to the aluminum carrier foil or the aluminum electrode are established via ultrasonic welding. Finally, in a step 412, the packet, including the jelly roll contacted with the corresponding contact elements and aluminum connecting terminals, is installed with a corresponding insulation in an aluminum housing and processed further in subsequent steps.

The exemplary embodiments described and shown in the figures are only selected as examples. Different exemplary embodiments may be combined with one another in their entirety or with respect to individual features. One exemplary embodiment may also be supplemented by features of another exemplary embodiment. Furthermore, method steps according to the present invention may be repeated and also executed in a sequence other than the one described.

What is claimed is:

1. A method for manufacturing a connecting contact for an electrode of an electrochemical store, wherein the electrode has a first material, the method comprising:
   providing a contact element in the form of a bar, wherein:
      at a first section of the bar, the bar includes an inner core made of a second material and includes a coating that is formed of the first material and that circumferentially surrounds the inner core;
      the bar includes a second section that, with respect to a direction in which the bar longitudinally extends, follows the first section;
      the inner core and the second section are integrally formed as a single component; and
      at the second section, the bar is formed entirely of the second material; and
   electrically and mechanically connecting the coating of the contact element to the electrode, wherein the first section is welded to the electrode and the bar is not welded to the electrode at the second section.

2. The method as recited in claim 1, wherein the first material includes copper and the second material includes aluminum.

3. The method as recited in claim 2, wherein in the step of electrically and mechanically connecting, the coated section of the contact element is connected to the electrode in an ultrasonic welding process.

4. A method for manufacturing an electrochemical store, comprising:
   providing an electrochemical storage element which includes a first electrode, a second electrode, and a separator situated between the first electrode and the second electrode, the first electrode having a first material and the second electrode having a second material;
   providing a first contact element for connecting the first electrode to a circuit and a second contact element for connecting the second electrode to the circuit, the first contact element and the second contact element having the second material, wherein each of the first and second contact elements are in the form of a bar;
   at a first section of the first contact element bar, coating the first contact element using the first material, so that the first contact element bar thereby includes an inner core of the second material circumferentially surrounded by a coating of the first material; and
   electrically and mechanically connecting the coating of the first contact element to the first electrode, and electrically and mechanically connecting the second contact element to the second electrode;
   wherein:
   the first contact element bar includes a second section that, with respect to a direction in which the first contact element bar longitudinally extends, follows the first section;
   the inner core and the second section are integrally formed as a single component;
   at the second section, the first contact element bar is formed entirely of the second material;
   the first section is welded to the first electrode; and
   the first contact element bar is not welded to the first electrode at the second section.

5. The method as recited in claim 4, wherein in the coating step, the first material is applied to the at least one section of the first contact element in an electroplating process.

6. The method as recited in claim 5, further comprising:
   prior to the coating step, removing an outer radial layer of the first contact element bar at the first section.

7. An electrochemical store, comprising:
   an electrochemical storage element which includes a first electrode, a second electrode, and a separator situated between the first electrode and the second electrode, the first electrode having a first material and the second electrode having a second material;

a first contact element which is configured to connect the first electrode to a circuit; and a second contact element which has the second material and is integrally joined to the second electrode and configured to connect the second electrode to the circuit;

wherein:

the first contact element is in the form of a bar;

at a first section of the bar, the bar includes an inner core made of the second material and includes a coating that is formed of the first material and that circumferentially surrounds the inner core;

the coating is integrally joined to the first electrode;

the bar includes a second section that, with respect to a direction in which the bar longitudinally extends, follows the first section;

the inner core and the second section are integrally formed as a single component;

at the second section, the bar is formed entirely of the second material;

the first section is welded to the electrode; and the bar is not welded to the electrode at the second section.

8. The electrochemical store as recited in claim 7, wherein the first electrode, the second electrode, and the separator situated between the first electrode and the second electrode are all designed as layers and are stacked on top of one another and wound up into a roll to form the electrochemical storage element, the first electrode and the second electrode being situated offset to one another in the stack in such a way that in the wound-up roll, an edge area of the first electrode protrudes on one side of the roll and is configured to contact the coating of the first contact element, and an edge area of the second electrode protrudes on a further side of the roll which is opposite to the first side, and wherein the edge area of the second electrode is configured to contact the second contact element.

9. The electrochemical store as recited in claim 7, further comprising:

a housing having the second material, wherein the housing is configured to accommodate the electrochemical storage element and enable a connection of the electrochemical store to the circuit with the aid of a first passage opening for the first contact element and a second passage opening for the second contact element.

10. The method as recited in claim 1, wherein the electrode is wound into a spiral configuration about an axis that is perpendicular to the direction in which the bar longitudinally extends.

11. The method as recited in claim 1, wherein the bar is formed by:

providing a starting bar made of the second material; and at the first section of the bar:

removing an outer circumferential layer of the bar so that the diameter of the bar in the first section is less than the diameter of the bar in the second section, thereby forming the inner core; and depositing the first material circumferentially around the inner core.

12. The method as recited in claim 11, wherein the removing includes applying a zincate pickling solution to the second material of the bar.

13. The method as recited in claim 10, wherein:

the winding of the electrode produces a plurality of layers of the electrode; and the mechanical connection of the coating to the electrode occurs at an edge region at which the plurality of layers of the electrode are pressed together into a single contact layer that is mechanically connected to the coating.

14. The method as recited in claim 13, wherein the contact layer, at its point of connection to the coating, extends longitudinally perpendicular to the axis.

15. The method as recited in claim 6, wherein the removal of the outer radial layer at the first section causes the first contact element bar to have a first diameter at a second section of the first contact element bar and to have a second diameter that is smaller than the first diameter at the first section.

* * * * *